United States Patent
Yeh

(10) Patent No.: US 7,583,262 B2
(45) Date of Patent: Sep. 1, 2009

(54) OPTIMIZATION OF TIME-CRITICAL SOFTWARE COMPONENTS FOR REAL-TIME INTERACTIVE APPLICATIONS

(76) Inventor: Thomas Yeh, 16340 Sloan Dr., Los Angeles, CA (US) 90049

( * ) Notice: Subject to any disclaimer, the term of this patent is extended or adjusted under 35 U.S.C. 154(b) by 282 days.

(21) Appl. No.: 11/461,451

(22) Filed: Aug. 1, 2006

(65) Prior Publication Data

US 2008/0030503 A1 Feb. 7, 2008

(51) Int. Cl.
*G06T 1/00* (2006.01)
(52) U.S. Cl. .................. 345/418; 345/473; 703/13; 706/45; 712/220; 718/102
(58) Field of Classification Search ................. 345/473
See application file for complete search history.

(56) References Cited

U.S. PATENT DOCUMENTS

| | | | |
|---|---|---|---|
| 5,187,796 A | 2/1993 | Wang et al. | |
| 5,390,138 A * | 2/1995 | Milne et al. | 381/119 |
| 5,421,022 A * | 5/1995 | McKeen et al. | 712/23 |
| 5,446,894 A * | 8/1995 | DeMar et al. | 718/107 |
| 5,448,735 A * | 9/1995 | Anderson et al. | 718/100 |
| 5,623,428 A | 4/1997 | Kunii et al. | |
| 5,835,767 A * | 11/1998 | Leigh | 718/104 |
| 5,877,777 A | 3/1999 | Colwell | |
| 5,973,699 A | 10/1999 | Kent | |
| 6,057,859 A | 5/2000 | Handelman et al. | |
| 6,223,201 B1 * | 4/2001 | Reznak | 718/103 |
| 6,232,974 B1 * | 5/2001 | Horvitz et al. | 345/419 |
| 6,249,288 B1 * | 6/2001 | Campbell | 345/629 |
| 6,393,480 B1 * | 5/2002 | Qin et al. | 709/224 |
| 6,441,821 B1 * | 8/2002 | Nagasawa | 345/426 |
| 6,996,552 B2 * | 2/2006 | Johnson | 706/52 |
| 7,058,896 B2 * | 6/2006 | Hughes | 715/757 |
| 7,243,262 B2 * | 7/2007 | Mukherjee et al. | 714/15 |
| 7,262,771 B2 * | 8/2007 | Snyder et al. | 345/426 |
| 7,289,941 B2 * | 10/2007 | Bordes | 703/6 |
| 7,475,001 B2 * | 1/2009 | Bordes et al. | 703/22 |
| 2003/0169278 A1 * | 9/2003 | Obrador | 345/629 |
| 2005/0055490 A1 * | 3/2005 | Widell et al. | 711/1 |
| 2005/0075154 A1 * | 4/2005 | Bordes et al. | 463/1 |
| 2005/0075849 A1 * | 4/2005 | Maher et al. | 703/2 |
| 2005/0086040 A1 * | 4/2005 | Davis et al. | 703/22 |
| 2005/0251644 A1 | 11/2005 | Maher et al. | |

(Continued)

OTHER PUBLICATIONS

"Enabling Real-Time Physics Simulation in Furture Interactive Entertainment" Yeh, Faloutsos and Reinman, Sandbox Symposium 2006, Boston, Massachusetts, Jul. 29-30, 2006 (ACM).*

(Continued)

*Primary Examiner*—Peter-Anthony Pappas
(74) *Attorney, Agent, or Firm*—Karry W. Wang, Esq.; Law Offices of K. W. Wang

(57) ABSTRACT

A method for optimizing the performance of a time-critical computation component for a real-time interactive application includes the use of an algorithm having a precise logical thread and at least one fast estimation logical thread. The computation errors generated by the fast estimation thread are imperceptible by humans and are frame specific such that the errors are corrected within a graphical frame's time by the data from the precise logical thread.

14 Claims, 4 Drawing Sheets

U.S. PATENT DOCUMENTS

2006/0106591 A1    5/2006    Bordes et al.
2006/0200331 A1*   9/2006    Bordes .................. 703/13
2008/0043026 A1*   2/2008    Bordes .................. 345/473

OTHER PUBLICATIONS

"Multi-threaded Rendering and Physics Simulation" Chabukswar, Lake and Lee Intel Software Solutions Group Feb. 2005.*
"Real-Time Deep Ocean Simulation on Multi-Threaded Architectures" Intel Developer Services Jan. 31, 2005.*
Threading 3D Game Engine Basics Gabb and Lake Nov. 17, 2005.*
"Asymmetric Physics Processing with ATI CrossFire" ATI Technologies, Inc. 2006.*
Lipasti et al. Exceeding the Dataflow Limit via Value Prediction. Proceedings of the 29th Annual IEEE/ACM International Symposium on Microarchitecture. Dec. 1996.*
Lipasti et al. Value Locality and Load Value Prediction. ACM SIGOPS Operating Systems Review. vol. 30. Issue 5. Dec. 1996.*
Tuck et al. Multithreaded Value Prediction. Proceedings of the 11th International Symposium on High-Performance Computer Architecture. 2005.*
Harrison et al. Obscuring Length Changes During Animated Motion. ACM Transactions on Graphics. vol. 23. Issue 3. Aug. 2004.*
Reitsma et al. Perceptual Metrics for Character Animation: Sensitivity to Errors in Ballistic Motion. ACM Transactions on Graphics. vol. 22. Issue 3. Jul. 2003.*
Calder et al. Selective Value Prediction. Proceedings of the 26th International Symposium on Computer Architecture. May 1999.*
Marcuello et al. Thread Partitioning and Value Prediction for Exploiting Speculative Thread-Level Parallelism. IEEE Transactions on Computers. Volume 53. No. 2. Feb. 2004.*
Intel. Threading Methodology: Principles and Practices. Version 2.0. 2004.*

* cited by examiner

OPTIMIZATION OF TIME-CRITICAL SOFTWARE COMPONENTS FOR REAL-TIME INTERACTIVE APPLICATIONS

FIELD OF THE INVENTION

The present invention relates generally to computation components for real-time interactive applications, and more particularly to methods for optimizing real-time physics simulations in an interactive environment.

BACKGROUND OF THE INVENTION

Interactive simulation of the real, physical world has become an essential part of many computer graphics and animation applications today, including those used in education, training, health, public policy and most notably, interactive entertainment.

In the early days of the interactive entertainment industry, virtual characters were heavily simplified, crude polygonal models. The scenarios in which they participated were also simple, requiring them to perform small sets of simple actions. Recent advances in graphics hardware and software techniques, however, have allowed interactive entertainment applications to approach cinematic quality. Unprecedented levels of visual quality and complexity in turn require high fidelity animation, and modern interactive entertainment applications have begun to incorporate new techniques into their motion synthesis engines. Among them, physics-based simulation is one of the most promising options.

The current state-of-the-art in motion synthesis for interactive entertainment applications is predominantly based on kinematic techniques: the motion of all objects and characters in a virtual world is derived procedurally or from a convex set of parameterized recorded motions. Such techniques offer absolute control over the motion of the animated objects and are fairly efficient to compute. The more complex the virtual characters are, however, the larger the sets of recorded motions will be. Thus, for the most complex virtual characters, it becomes impractical to record the entire set of possible motions that their real counterparts can do.

As an alternative approach to the motion synthesis problem, physics-based simulation computes the motion of virtual objects by numerically simulating the laws of physics. Physics-based simulation provides physical realism and automated motion calculation, but it also bears greater computational cost, difficulty in object control, and potentially unstable results.

In order to provide the perception of visual continuity, gaming hardware must provide at least 30 graphical frames every second. This constraint directly impacts the physics engine, which calculates an approximation of what happens in real life most often via an iterative algorithm. Typically, a physics engine such as Open Dynamics Engine requires at least 20 iterative calculations to generate accurate and stable data. Due to the interdependency of the physics engine with other software components, however, the physics engine must calculate and deliver the results of physical interactions in the virtual world at a fraction of the minimum frame rate of 30 frames per second in order for the graphical frames to be rendered at the frame rate. With more sophisticated applications combining massive numbers of complex entities, the cost of robust physics simulation can easily exceed the capability of today's most powerful machines.

Accordingly, there exists a need for a more efficient and cost effective technique in using physics engines to render perceivably realistic simulation graphics.

SUMMARY OF THE INVENTION

The present invention is directed to a method for optimizing the efficiency of time-critical computation components for real-time interactive applications. More specifically, the present invention discloses a method for enhancing the performance of a physics engine or an artificial intelligence code by utilizing a more efficient simulation algorithm.

In a preferred embodiment, a physics-based simulation algorithm in accordance with the present invention includes a precise logical thread and at least one fast estimation logical thread. The precise thread computes a full set of data for everything that occurs in each simulation frame, with accuracy and stability. The one or more fast estimation threads produce either estimated or partial data only to enable each of the graphical frames to appear realistic. All threads calculate on a frame-by-frame basis, using the same computation cycle. Depending on the underlying application, the computation cycle may be any mathematical set of instructions, such as an iterative algorithm. The data from the fast estimation thread or threads may be less accurate, but they stay within such tolerance levels that the errors are imperceptible by humans.

For each frame, the fast estimation data are completed in a fraction of the frame's time and are fed to critical dependent simulation components. While the dependent components execute the fast estimation data, the precise thread completes its calculation for all data pertaining to the frame. The precise data are then fed back to the source component as the starting point for both the precise and fast estimation threads to compute for the next frame. As such, any errors of the fast estimation thread or threads are effectively limited and never allowed to propagate beyond a frame's worth of time.

It is an object of the present invention to provide a method for generating perceivably acceptable physics simulation data on a frame-by-frame basis.

It is a further object of the present invention to provide a method for eliminating errors within a frame's perceivably acceptable physics simulation data prior to the start of the next frame's data calculations.

It is another object of the present invention to provide a method for generating consistent physics simulation data for multi-user applications.

BRIEF DESCRIPTION OF THE DRAWINGS

The foregoing and other objects, aspects and advantages will be better understood from the following description of the embodiments in accordance with the present invention with reference to the accompanying drawing, wherein.

DETAILED DESCRIPTION OF THE INVENTION

Figure 1:
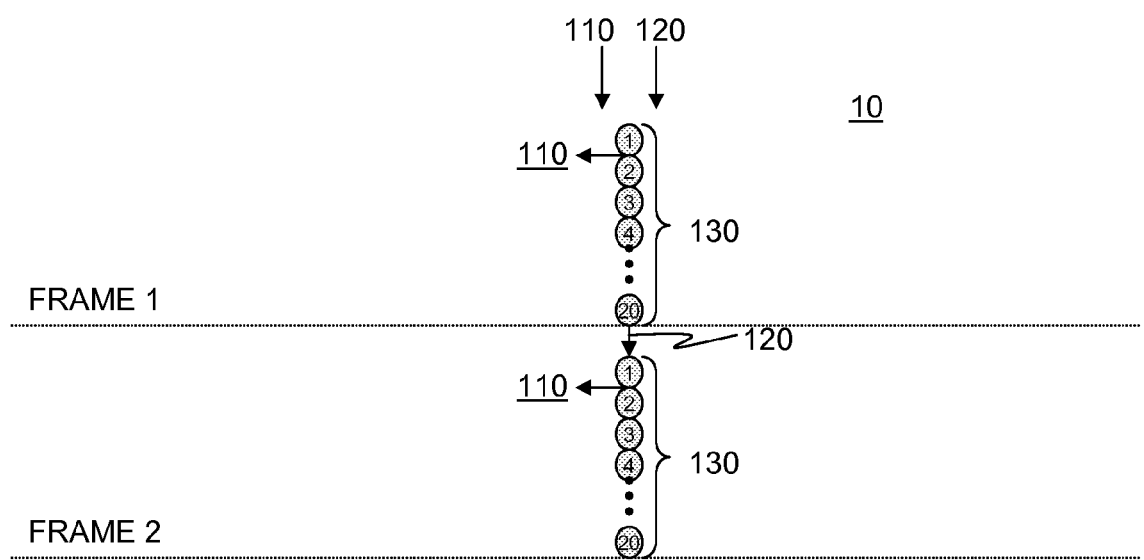
FIG. 1 is a flow chart of an exemplar physics simulation algorithm in accordance with the present invention.

Unlike most scientific applications, interactive gaming and certain other interactive computing generally have looser requirements on simulation accuracy. While it is important that simulated actions are visually believable, recent studies have actually quantified errors that are visually imperceptible. [See Harrison, J., Rensink, R. A., and van de Panne, M. 2004, *Obscuring Length Changes During Animated Motion*, ACM Trans. Graph. 23, 3, 569-573; See also Reitsma, P. S. A., and Pollard, N. S. 2003, *Perceptual Metrics For Character Animation: Sensitivity to Errors in Ballistic Motion*, ACM Trans. Graph. 22, 3, 537-542.] For instance, length changes below 2.7% cannot be perceived by an average human observer, while changed of over 20% are always visible [Harrison et al. 2004]. This error tolerance increases with scene clutter and high-speed motions [Harrison et al. 2004].

In view of the human tolerance for imperceptible physics error, the present invention offers a method of optimizing interactive real-time physics simulation that incorporates a trade-off of accuracy for performance.

An algorithm in accordance with the instant invention includes at least two logical threads: a precise thread and at least one fast estimation thread. Each thread utilizes its own evaluation method for the same computation cycle. As their names may suggest, the precise thread yields stable and accurate data while the fast estimation thread generates data that are just "good enough" for a particular graphics frame and are thus less accurate and may be unstable for subsequent frames. The fast estimation data are forwarded to critical dependent simulation components while the precise data are fed back to the source component, such as a physics engine or an artificial intelligence component, for next frame's computation. The precise data may also be sent to certain other components not on the critical path, should any such components require precise data.

More specifically, the less accurate and possibly unstable data generated by the fast estimation thread are pre-determined or dynamically tuned to be within the error tolerance (i.e., imperceptible by users) on a per graphical frame basis. The types of estimated data include those that contain imperceptible positional errors, partial data that pertain only to objects of one graphical frame, and others of similar nature. Further details on data produced by a fast estimation thread are provided below in the examples.

By generating these less time-consuming yet perceivably perfect data, the performance of a physics engine or an artificial intelligence code can be dramatically increased to more easily meet its minimum frame-rate requirement. However, visually acceptable errors may be of much larger magnitude than what the physics engine can tolerate. Such data for one frame should not be used to generate physics data for subsequent frames, as the error may propagate beyond tolerable levels and may eventually cause the physics engine to cease function.

As an error-control measure, therefore, the precise thread is allowed to complete all of the necessary computation for accurate data in parallel with the rest of the interactive application. In other words, while the fast estimation thread provides an estimated solution to the dependent software components within some fraction of a frame's time, the physics simulation loop is continued for the precise thread for the remainder of the frame's time. By the time the immediate graphical frame is simulated by the dependent components, the error-free data produced by the precise thread is fed back to the physics engine for both the precision and the fast estimation threads for simulating the next frame. As such, the errors of the fast estimation thread are effectively limited and never allowed to propagate beyond a frame's worth of time.

By exploiting the different error tolerances, more than one fast estimation thread may be used. Depending on the accuracy requirements of the dependent application components, different estimation threads may be used to generate suitable data.

EXAMPLE 1

Application Requiring One Time-Step per Frame

Turning now to FIG. 1, an exemplar iterative algorithm 10 of a typical physics engine in accordance with the instant invention includes a fast estimation thread 110 and a precise thread 120. This application requires only one time-step per frame.

Both the fast estimation thread 110 and the precise thread 120 start at the beginning of the iteration loop 130, which includes 20 iterations to generate accurate and stable data. Since the minimum frame rate for maintaining the perception of visual continuity is 30 frames per second, each frame must be rendered within $\frac{1}{30}^{th}$ of a second. Accordingly, each dependent simulation component must receive perceivably acceptable simulation solution in a fraction of $\frac{1}{30}^{th}$ of a second.

Here, it is pre-determined that a single computational iteration would produce estimated solutions that can be used by the dependent software components to render perceivably acceptable simulations for a given graphical frame. After the first iteration for the first frame, therefore, the physics simulation solution generated by the fast estimation thread 110 is taken out of the iteration loop 130 and is forwarded to the dependent critical components, such as a graphics processing unit ("GPU"). While the first graphical frame is being rendered with the solution from the fast estimated thread 110, the precise thread 120 stays in the iteration loop 130 until the end of the 20 iterations. The accurate and stable solution yielded from the precise thread 120 is then fed back to the iteration loop 130 for the next frame for both the fast estimation thread 110 and the precise thread 120, and the same iterative process repeats.

EXAMPLE 2

Application Requiring Two Time-Steps per Frame

Figure 2:
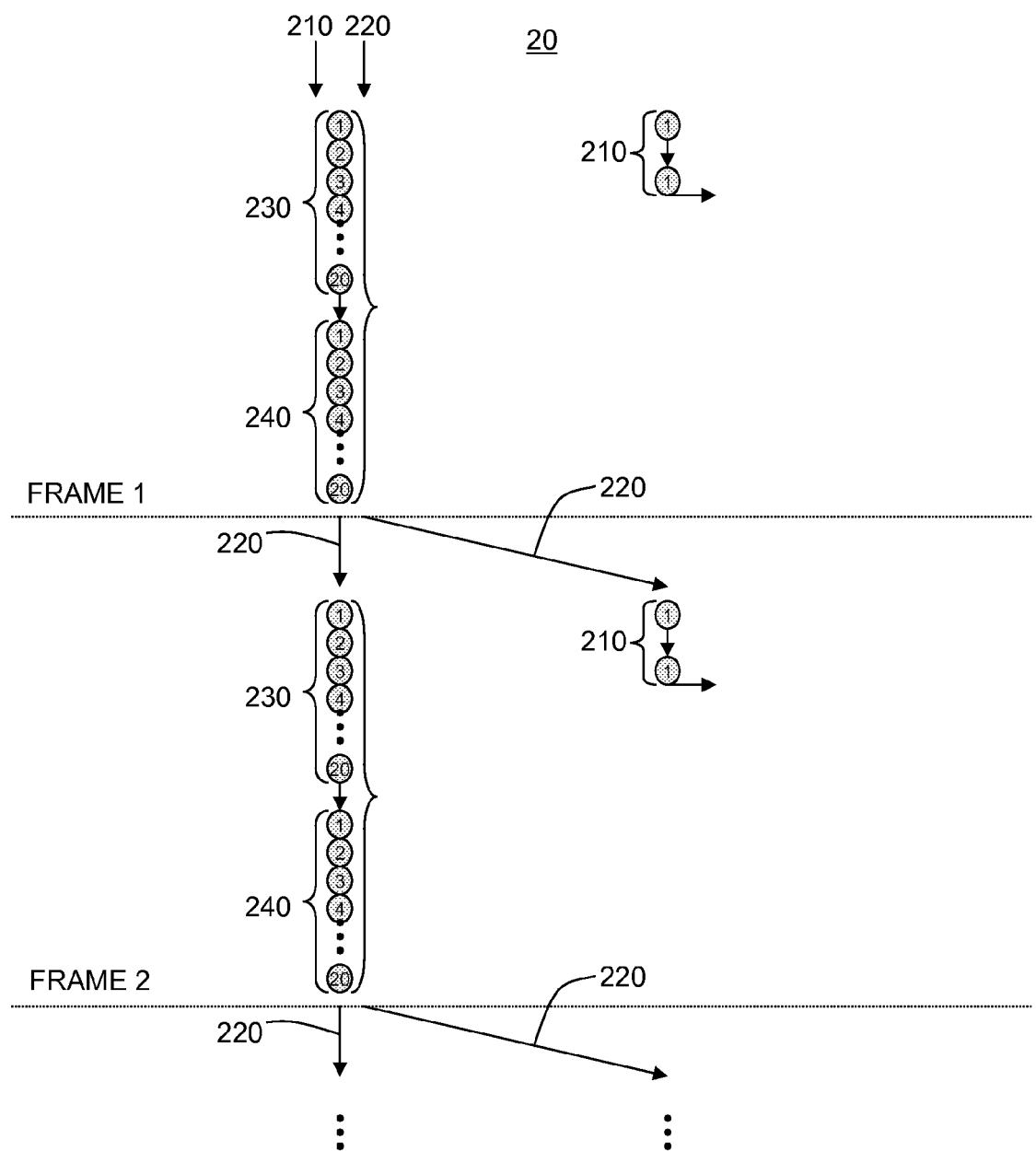
FIG. 2 is a flow chart of another exemplar physics simulation algorithm in accordance with the present invention.

Referring to FIG. 2, another iterative algorithm 20 of a typical physics engine in accordance with the instant invention includes a fast estimation thread 210 and a precise thread 220. Unlike Example 1 above, algorithm 20 includes 2 identical iteration loops 230 and 240 per frame, one for each of the two time-steps needed for the application. This type of algorithm, running multiple simulation steps for one frame, is common for graphical frames displaying fast-moving objects, as the time-steps allow segmented and progressive simulation of the movement of the objects, which enables the movement to be calculated more accurately.

Both the fast estimation thread 210 and the precise thread 220 commence at the beginning of the iteration loop 230, which includes 20 iterations per time-step, and two time-steps are needed to generate accurate and stable data. Again, each frame must be rendered within $\frac{1}{30}^{th}$ of a second, and each dependent simulation component must receive perceivably acceptable simulation solution in a fraction of $\frac{1}{30}^{th}$ of a second.

Similar to Example 1 above, it is pre-determined here that a single computational iteration running through both time-steps per frame would yield estimated solutions that can be used by the dependent software components to render visually acceptable simulations for a frame.

After the first iteration of iteration loop 230 is completed for the first frame, the resulting solution is sent to the beginning of iteration loop 240 for the second time-step for the same frame. After the completion of the first iteration within iteration loop 240, the physics simulation solution generated by the fast estimation thread 210 is taken out of the iteration loop 240 and is forwarded to the dependent critical components, such as a GPU. While the first graphical frame is being rendered with the solution from the fast estimated thread 210, the precise thread 220 stays in the iteration loops 230 and 240 and continues through every one of the 40 iterations. The accurate and stable solution yielded from the precise thread 220 is then fed back to the iteration loop 230 for the next frame for both the fast estimation thread 210 and the precise thread 220, and the same iterative process repeats.

The precise thread in both Examples 1 and 2 runs through the entirety of the iterative computation cycle. Such may not always be the case. An application may only require the precise thread to go through 18 out of 20 iterations, for example, to generate data that are accurate and stable enough for the entire simulation.

EXAMPLE 3

Partial Estimation

A known estimation method called "view culling" or "view frustum culling" applies culling to physics computation. In graphics rendering, view culling reduces the amount of computation by filtering out objects that are outside of a user's view frustum or the field of view of the notional camera. In other words, view culling calculates only the objects that may appear on the screen. This example presents a new technique similar to but more flexible and efficient than the traditional view culling.

Figure 3:
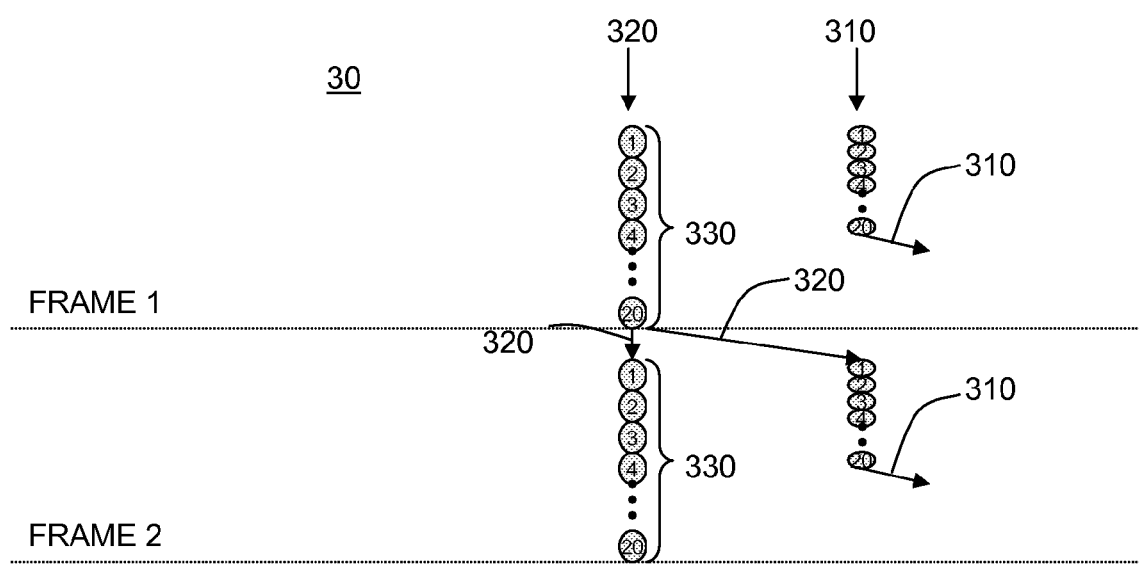
FIG. 3 is a flow chart of yet another exemplar physics simulation algorithm in accordance with the present invention.

Referring now to FIG. 3, another algorithm 30 of a typical physics engine in accordance with the instant invention includes a fast estimation thread 310 and a precise thread 320.

Similar to Examples 1 and 2, both the fast estimation thread 310 and the precise thread 320 start at the beginning of the iteration loop 330, which includes 20 iterations to generate accurate and stable data. Since the minimum frame rate for maintaining the perception of visual continuity is 30 frames per second, each frame must be rendered within $1/30^{th}$ of a second. Accordingly, each dependent simulation component must receive perceivably acceptable simulation solution in a fraction of $1/30^{th}$ of a second.

Unlike Examples 1 and 2, however, the fast estimation thread 310 runs through the same 20 iterations as the precise thread 320. The difference between the two threads is that the fast estimation thread only calculates data for objects within certain minimal volume enclosing the player in a particular graphical frame, while the precise thread calculates data for all objects. Such volume of influence can be defined as, for example, all objects that are viewable in the field of the notional camera. Because of the removal of calculations for non-viewable objects, the fast estimation thread is able to complete its evaluation in a fraction of the time it takes the precise thread to finish.

Thus, while the first graphical frame is being rendered with the solution from the fast estimated thread 310, the precise thread 320 stays in the iteration loop 330 to generate data for all objects. The accurate and stable solution yielded from the precise thread 320 is then fed back to the iteration loop 330 for the next frame for both the fast estimation thread 310 and the precise thread 320, and the same iterative process repeats. As the scene changes, therefore, new fast estimates for viewable objects of any frame can be readily calculated from the available precise data of all objects from the previous frame.

The method described in this Example 3 can be further combined with those discussed in Examples 1 and/or 2 by exploiting the fact that sensory fidelity degrades with distance. As the distance of an object from the user increases, the amount of perceivable detail decreases, which increases the tolerable error threshold.

For example, consider a user's virtual character standing in front of a wall. If the character is close enough to the wall, the user will not be able to perceive any physical interactions beyond the wall itself, and computation for all of the non-viewable objects can be removed when executing the fast estimation thread for dependent components related to the sense of sight. The data from this partial estimation are as accurate for the objects viewable for the particular frame as those for the same objects from the precise data, but the fast estimation thread is able to reach a solution quicker due to the removal of non-viewable object calculations. When the character moves far away from the wall and sees all objects in the scene, however, then all of the computations will need to be done but more error can be tolerated. The method disclosed in Examples 1 and/or 2 can then be used.

This new technique differs from prior art which tries to cull physics computation by using complicated methods to estimate when objects outside a user's view will come into the view. With the instant invention, no such additional complicated methods are required as the complete data for all objects are always available from the precise thread at the beginning of each frame's calculation cycle. Furthermore, prior work does not work on multiplayer or massive multiplayer applications where the entire virtual world has to be consistent. The prior methods for estimating when previously unseen objects would come into the view would necessarily be view specific and, as such, would render physical inconsistencies for very different viewpoints. The present invention eliminates this problem because each of the viewpoints/characters is calculated from the same data from the precise thread. Lastly, depending on how much different sensory information is desired surrounding the player or main character whose view point determines the notional camera's field of view, the volume of influence can be expanded or contracted to include more or less objects that may affect the player. Thus, the volume of influence method disclosed herein is more flexible and efficient than the traditional view culling method.

EXAMPLE 4

Agents with Artificial Intelligence

In the world of interactive computing, an autonomous agent is "a system situated within and a part of an environment that senses that environment and acts on it, over time, in pursuit of its own agenda and so as to effect what it senses in the future" [*Programming Game AI By Example*, Mat Buckland, 2005, World Publishing Inc.]. For example, each computer-controlled car in a racing game is an agent. For a sports game such as a basketball or soccer game, each computer-controlled player is an agent. This example discusses a method for improving the performance of artificial intelligence for an interactive application involving multiple agents.

Figure 4:
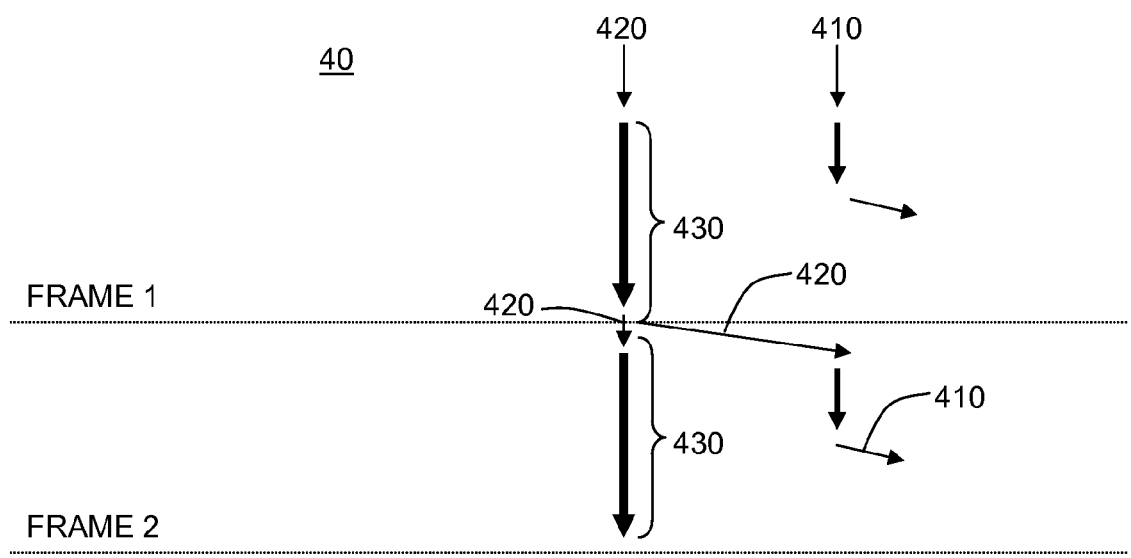
FIG. 4 is a flow chart of still another exemplar physics simulation algorithm in accordance with the present invention.

Turning now to FIG. 4, algorithm 40 of a typical artificial intelligence code in accordance with the instant invention includes a fast estimation thread 410 and a precise thread 420.

Both the fast estimation thread 410 and the precise thread 420 start at the beginning of the data computation cycle 430, which may not be an iteration loop. The fast estimation thread 410 runs through the same calculations as the precise thread 420. However, the fast estimation thread only calculates data for the artificial intelligence tasks of nearby (as defined by certain volume appropriate for the given tasks) agents in a particular graphical frame, while the precise thread calculates such data for all agents. Because of the removal of calculations for agents that do not have a sensory effect on the user, the fast estimation thread is able to complete its evaluation in a fraction of the time it takes the precise thread to finish.

Thus, while the first graphical frame is being rendered with the solution from the fast estimated thread 410, the precise thread 420 stays in computation cycle 430 to generate data for all agents' artificial intelligence tasks. Data yielded from the precise thread 420 is then fed back to computation cycle 430 for the next frame for both the fast estimation thread 410 and the precise thread 420, and the same process repeats. As the nearby agents change, therefore, new fast estimates for their artificial intelligence tasks for any frame can be readily calculated from the available precise data from the previous frame.

It should be evident that, although only physics engines and artificial intelligence components have been discussed in detail above, the present invention can be used for any time-critical software component in a real-time interactive application where multiple consumers use its data, and where the data accuracy or the amount of data required for different consumers can vary drastically.

Therefore, although the invention herein has been described with references to particular embodiments, it is to be understood that the embodiments are merely illustrative of, and are not intended as a limitation upon, the principles and application of the present invention. It is therefore to be understood that various modifications may be made to the above mentioned embodiments and that other arrangements may be devised without departing from the spirit and scope of the present invention.

For example, instead of having one algorithm with at least one fast estimation thread and a precise thread, each of the threads may use a different algorithm. Similarly, there may be more than one precise thread, depending on the structure of the underlying application. Furthermore, each logical thread may be executed on a different hardware thread or core. Each thread may also be further broken down into parallel threads to speed up the execution.

Furthermore, the logical threads may be executed separately on different machines. For instance, in a massive multiplayer online game environment, the user machines (e.g., game consoles or personal computers) can execute the fast estimation thread or threads while the machines at the application provider end (e.g., the server) can execute the precise thread and send the accurate position and orientation of the objects across the network to all user machines. This setup enables less powerful machines at the user side to run an acceptable frame rate while the more powerful server machines generate precise physical simulation of the virtual game world. Similarly, the fast estimation thread or threads may be executed by mobile devices such as a laptop or a game console while a server connected to the mobile devices, either wirelessly or by cables, can execute the precise thread. Other similar setups or combinations may also be used.

I claim:

1. A method for a real-time interactive physics-based simulation, the method comprising:
   executing a precise logical thread, wherein said precise logical thread computes a full set of data for everything that occurs in each graphical frame of said physics-based simulation with accuracy and stability; and
   executing at least one fast estimation logical thread, wherein said at least one fast estimation logical thread produces either estimated or partial data only to enable each graphical frame of said physics-based simulation to appear realistic,
   wherein the precise logical thread completes its evaluation at an end of a computation cycle, and the at least one fast estimation logical thread completes its evaluation prior to the end of the computation cycle.

2. The method of claim 1, wherein the data generated by the precise logical thread are fed back to an algorithm.

3. The method of claim 2, wherein the data generated by the at least one fast estimation logical thread are forwarded to one or more dependent components for processing.

4. The method of claim 3, wherein the data generated by the precise logical thread that are fed back to the algorithm are used to compute new sets of data for both the precise logical thread and the at least one fast estimation logical thread.

5. The method of claim 4, wherein the rendered simulation contains computational errors imperceptible by humans.

6. The method of claim 5, wherein the computation cycle is completed within the time needed for rendering a simulated graphical frame.

7. The method of claim 6, wherein the at least one fast estimation logical thread is further broken down into a plurality of threads being executed in parallel.

8. The method of claim 6, wherein the computational errors consist of inaccurate data.

9. The method of claim 6, wherein the computational errors consist of partial data.

10. The method of claim 6, wherein said threads are selected from a member of the group consisting of: a physics engine, and artificial intelligence code.

11. The method of claim 1, wherein the computation cycle comprises two or more sub-computation cycles.

12. The method of claim 11, wherein the at least one fast estimation logical thread runs through sequentially a portion of each of the two or more sub-computation cycles.

13. The method of claim 1, wherein said logical threads are executed on a interactive computing system.

14. The method of claim 13, wherein said interactive computing system is a gaming console.

* * * * *